May 16, 1967  A. L. VON TERSCH  3,319,306
CABLE SHORTENING DEVICE
Filed Aug. 16, 1965

INVENTOR
ALFRED L. VON TERSCH
BY Bair, Freeman & Molinare
Attys.

United States Patent Office 3,319,306
Patented May 16, 1967

3,319,306
CABLE SHORTENING DEVICE
Alfred L. Von Tersch, Clarinda, Iowa, assignor to Lisle Corporation, Clarinda, Iowa, a corporation of Iowa
Filed Aug. 16, 1965, Ser. No. 479,915
3 Claims. (Cl. 24—71.1)

This invention relates to a cable shortening device particularly adapted for shortening the brake cables of an automobile or the like.

One object of the invention is to provide a cable shortening device utilizing the principle of a pair of spaced seats for a cable and a hook bolt for pulling the portion of the cable between the seats into a V-shape, thus effectively shortening the distance between the portions of the cable in the seats.

Another object is to provide such a cable shortening device which is of very simple and inexpensive construction, and formed of a minimum of parts, whereby the device can be sold at very low cost.

More specifically, it is an object to provide a cable shortening construction wherein one part is a hook bolt and the other part is a very simple cylindrical body having one end open and its other end constricted to a truncated cone-shape having a small opening through which the hook bolt extends, the other (open) end of the cylinder having its marginal edge deformed at two diametrically opposite points into curved seats for the cable which permits sliding of the cable across the seats during the tightening operation.

With these and other objects in view, my invention consists in the construction, arrangement and combination of the various parts of my cable shortening device, whereby the objects above contemplated are attained, as hereinafter more fully set forth, pointed out in my claims and illustrated in detail on the accompanying drawing, wherein:

Figure 1:
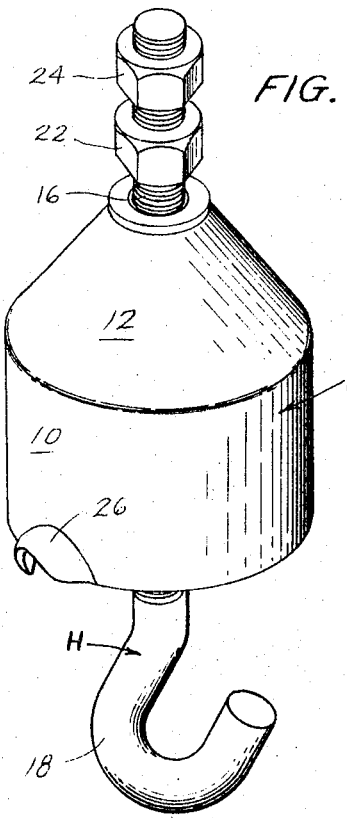
FIG. 1 is an enlarged perspective view of a cable tightening device embodying my invention.
Figure 2:
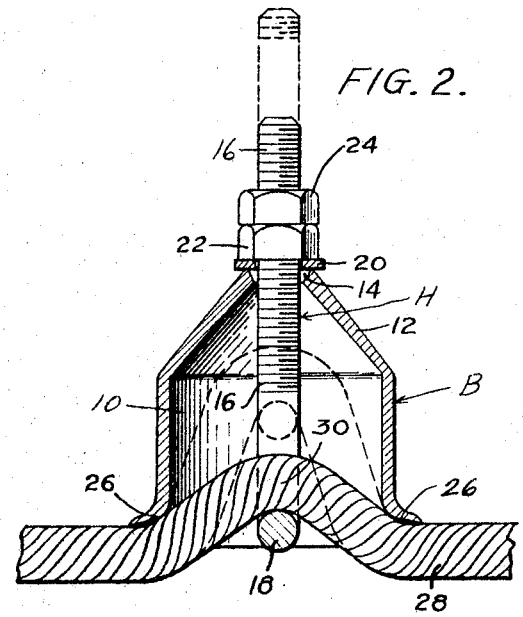
FIG. 2 is a vertical sectional view thereof showing the device applied to a cable.
Figure 3:
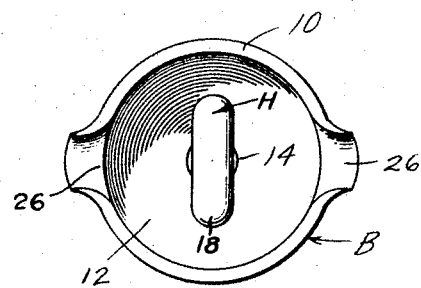
FIG. 3 is a bottom plan view of FIG. 2 with the cable omitted.

On the accompanying drawing I have used the reference character B to indicate generally a cylindrical body and H a hook bolt. The body B may be formed of steel tubing or the like of suitable length and has two distinct portions identified 10 and 12 on the drawing. The portion 10 is the original tubular shape of the tube whereas the portion 12 is truncated cone-shape and is produced by forming or constricting a portion of the tube 10 in suitable dies. The upper end is not completely closed but is left open as indicated at 14 to provide a hole through which the shank 16 of the hook bolt H may extend. As illustrated in FIG. 2 the hook 18 of the hook bolt is located within the body B, and at the upper end of the body a washer 20, a take-up nut 22 and a lock nut 24 are provided.

Figure 4:
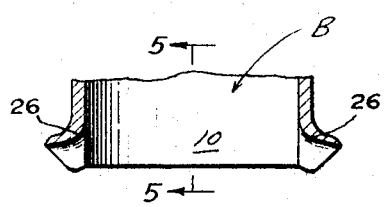
FIG. 4 is a sectional view similar to the lower portion of FIG. 2 showing the cable seats in greater detail.
Figure 5:
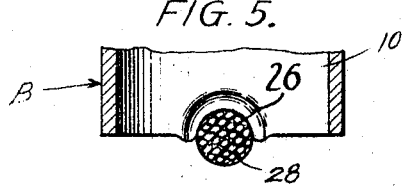
FIG. 5 is a sectional view on the line 5—5 of FIG. 4 showing further details of a cable seat.

The lower end of the body B is provided with a pair of cable seats 26 which are formed by displacing diametrically opposite marginal portions of the lower end of the cylindrical wall 10 to form in effect notches as illustrated in FIG. 6, the seats 26 being thereby provided with side walls and a top wall wherein the top wall is rounded into the vertical wall 10 as shown in FIG. 4 for smooth sliding of a cable 28 across these seats when the device is used as illustrated in FIG. 2.

It will be noted the cable 28 has two spaced portions against the seats 26 whereas a portion 30 intermediate the seats extends up over the hook 18 of the hook bolt H. Accordingly, the parts may be associated as shown in solid lines and the cable 28 effectively shortened by tightening the takeup nut 22 against a washer 20, the parts then assuming a position such as indicated in dotted lines and which, of course, can be varied depending upon the degree of cable shortening desired. The lock nut 24 may then be run against the nut 22 to hold the adjustment.

From the foregoing specification it will be obvious that I have provided a comparatively simple cable shortening device that can be inexpensively fabricated from stock hook bolts and steel tubing. A comparatively simple die set is needed to form the truncated cone-shaped portion 12 and the seats 26 whereby the body portion can be quickly fabricated at little expense.

I am aware that cable shorteners have been heretofore patented using the same general principle for tightening a cable by the use of a hook bolt but in most of these prior art devices the body part is of complicated and expensive construction when compared with the type of tubular body portion I provide. At the same time, the body being tubular utilizes a well known mechanical principle involving the strength of a tubular structural member as distinguished from other types of construction. Also, the body requires but a single part which has both the requirement of an opening for the shank of the hook bolt and seats for the cable in the proper relationship to each other.

Some changes may be made in the construction and arrangement of the parts of my cable shortening device without departing from the real spirit and purpose of my invention, and it is my intention to cover by my claims any modified forms of structure or use of mechanical equivalents which may reasonably be included within their scope.

I claim as my invention:

1. In a cable shortening device, a sheet metal cylindrical body having one end open, its opposite end being truncated cone-shaped and having a relatively small opening at said opposite end, a hook bolt having its hook located in said cyindrical body and its shank extending outwardly through said relatively small opening, a take-up nut on the outer end thereof, the peripheral edge of said first mentioned end of said cylindrical body having a pair of diametrically opposite notches to form seats for a cable coacting therewith and which cable has a portion thereof intermediate said seats extending over said hook.

2. A cable shortening device according to claim 1 wherein said cable seats are formed as displaced marginal portions of the cylindrical wall of said body and include lips extending radially outward from said cylindrical wall and having portions at substantially right angles to the wall and forming curved seats merging therewith.

3. A cable shortening device according to claim 2 wherein said truncated cone-shaped end is formed as a constriction of said cylindrical body.

References Cited by the Examiner
UNITED STATES PATENTS

| | | | |
|---|---|---|---|
| 505,527 | 9/1893 | Hunt | 254—67 XR |
| 2,621,383 | 12/1952 | Tresidder | 24—278 |
| 2,696,648 | 12/1954 | Sperti | 24—71.1 |

BERNARD A. GELAK, *Primary Examiner.*